United States Patent [19]

Perry et al.

[11] Patent Number: 5,266,679
[45] Date of Patent: Nov. 30, 1993

[54] METHOD FOR PRODUCING POLYAMIDE-IMIDES FROM CO, BIS-IMIDE AND POLYAMINE

[75] Inventors: Robert R. Perry; S. Richard Turner, both of Pittsford; Richard W. Blevins, Rochester, all of N.Y.

[73] Assignee: Eastman Kodak Company, Rochester, N.Y.

[21] Appl. No.: 752,738

[22] Filed: Aug. 30, 1991

[51] Int. Cl.$^5$ ............................................. C08G 73/14
[52] U.S. Cl. ..................................... 528/322; 528/15; 528/25; 528/27; 528/28; 528/33; 528/170; 528/220; 528/225; 528/229; 528/319; 528/321
[58] Field of Search ................. 528/322, 321, 319, 15, 528/25, 27, 28, 33, 220, 225, 229, 170

[56] References Cited

U.S. PATENT DOCUMENTS

| | | | |
|---|---|---|---|
| 4,933,419 | 6/1990 | Perry et al. | 528/86 |
| 4,933,466 | 6/1990 | Perry et al. | 548/476 |
| 4,933,467 | 6/1990 | Perry et al. | 548/476 |
| 4,933,468 | 6/1990 | Perry et al. | 548/476 |

FOREIGN PATENT DOCUMENTS 281077  11/1987  Japan .

OTHER PUBLICATIONS

*Macromolecules* "Novel Synthesis of Aromatic Polyamides by Palladium-Catalyzed Polycondensation of Aromatic Dibromides, Aromatic Diamines and Carbon Monoxide" 1988, vol. 21, 1908–1911.
*Chemical Communications,* J. of the Chemical Soc., W. J. Scott, 1987, 1755.
*Chemical Communications,* J. of the Chemical Soc., Mutin et al, 1988, 896.

Primary Examiner—Harold D. Anderson
Attorney, Agent, or Firm—Robert Luke Walker

[57] ABSTRACT

A method for preparing a polymer including the step of reacting carbon monoxide and a reactant pair having respective general formulas

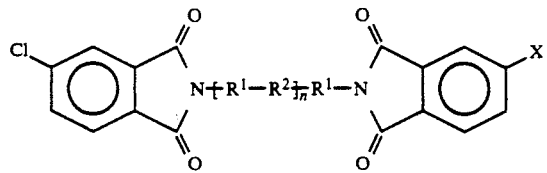

and

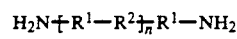

or a reactant having the general formula

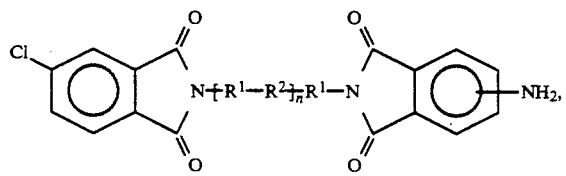

in the presence of catalyst and free iodo or bromo ions. X is —Br or —I. n is an integer from 0 to 4. $R^1$ is selected from the group consisting of alkyl, arylalkyl, aryl, heteroaryl, and cycloalkyl. $R^2$ is selected from the group consisting of

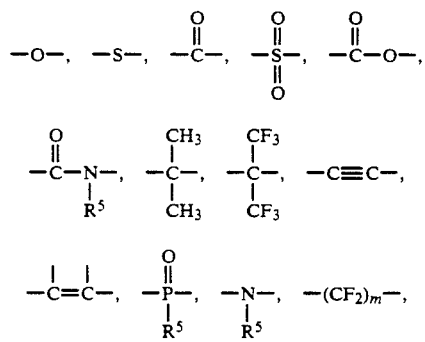

and (Abstract continued on next page.)

-continued
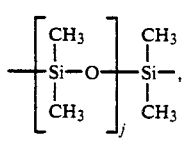
wherein each $R^5$ is independently selected from the group consisting of alkyl and aryl, m is an integer from 1-12, and j is an integer between 0 and 300.
9 Claims, No Drawings

METHOD FOR PRODUCING POLYAMIDE-IMIDES FROM CO, BIS-IMIDE AND POLYAMINE

CROSS-REFERENCE TO RELATED APPLICATIONS

This invention relates to the inventions disclosed in the following U.S. patent applications, which have been cofiled with this application and are commonly assigned: "METHOD FOR THE PREPARATION OF POLYAMIDE-IMIDES", by Robert J. Perry, S. Richard Turner and Richard W. Blevins, Ser. No. 07/753,275; "METHOD FOR PREPARING POLYAMIDE-IMIDES", by Robert J. Perry S. Richard Turner and Richard W. Blevins, Ser. No. 07/753,248; "METHOD FOR PRODUCING POLYAMIDE-IMIDES", by Robert J. Perry, S. Richard Turner and Richard W. Blevins, Ser. No. 07/752,737; and "A METHOD FOR PREPARING POLYAMIDE-IMIDES", by Robert J. Perry, S. Richard Turner and Richard W. Blevins, Ser. No. 07/752,736.

BACKGROUND OF THE INVENTION

The present invention pertains to methods for preparing aromatic polymers. More particularly, the present invention pertains to processes for the preparation of polyamide-imides. Polyamide-imides are generally prepared by the reaction of 4-trimellitoyl anhydride chloride with an appropriate diamine as shown below.

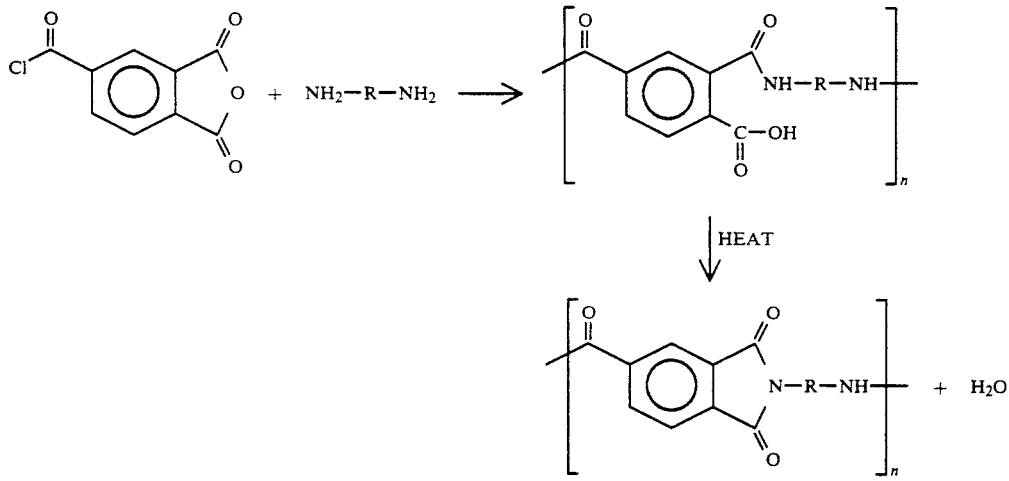

In that procedure, an intermediate polyamic acid is cyclized in an imide forming step with the elimination of water. This procedure presents the shortcomings of using moisture sensitive acid chlorides and driving off a small molecule in the imide forming step, which can create voids and defects in the polymer product. Polyamide-imides produced by this procedure have a backbone of alternating amide and imide units.

Japanese Kokai 123823, published May 16, 1989, and Yoneyama et al, Macromolecules, Vol. 21, 1988, pp. 1908-1911 disclose the use of a Heck carbonylation reaction, that is, a transition metal catalyzed carbonylation and coupling, in the preparation of low molecular weight polyamides. U.S. Pat. Nos. 4,933,419; 4,933,466 and 4,933,467; and 4,933,468 disclose methods which utilize Heck carbonylation reactions to produce esters, imides and amide-imides, respectively. Scott, W. J., "Journal of the Chemical Society, Chemical Communications", (1987), 1755 and Mutin, R. et al, "Journal of the Chemical Society, Chemical Communications", (1988), 896, teach palladium catalyzed carbonylation reactions of chloroarenes using $Cr(CO)_3$ Bozell, J. J., et al, "Journal of the American Chemical Society", 110, (1988), 2655, teaches a palladium catalyzed carbonylation reaction of chloroarenes which requires both Ni and Pd catalysts and the presence of NaI.

It is therefore highly desirable to provide improved methods for the preparation of polyamide-imides.

It is also highly desirable to provide improved methods for the preparation of polyamide-imides from preformed imides which utilize a Heck carbonylation reaction rather than a post polymerization cyclization to give the imide structure.

It is also highly desirable to provide improved methods for the preparation of polyamide-imides which avoid the use of hydrolytically unstable acid chlorides.

It is finally highly desirable to provide improved methods for the preparation of polyamide-imides which provide all of the above desired features.

SUMMARY OF THE INVENTION

It is an object of the invention to provide improved methods for the preparation of polyamide-imides.

It is another object of the invention to provide improved methods for the preparation of polyamide-imides from preformed imides which utilize a Heck carbonylation reaction rather than a post polymerization cyclization to give the imide structure.

It is another object of the invention to provide improved methods for the preparation of polyamide-imides which avoid the use of hydrolytically unstable acid chlorides.

It is finally an object of the invention to provide improved methods for the preparation of polyamide-imides which provide all of the above desired features.

In the broader aspects of the invention there is provided a method for preparing a polymer including the step of reacting carbon monoxide and a reactant pair having respective general formulas

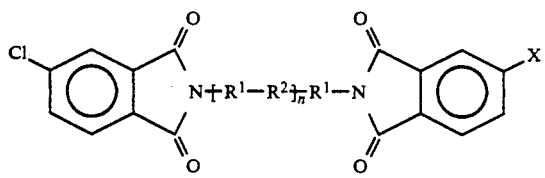

and

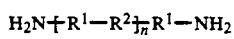

or a reactant having the general formula

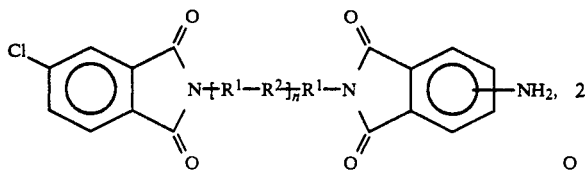

in the presence of catalyst and free iodo or bromo ions. Each X, $R^1$, $R^2$, and n is independently selected. X is —Br or —I. n is an integer from 0 to 4. $R^1$ is selected from the group consisting of alkyl, arylalkyl, aryl, heteroaryl, and cycloalkyl. $R^2$ is selected from the group consisting of

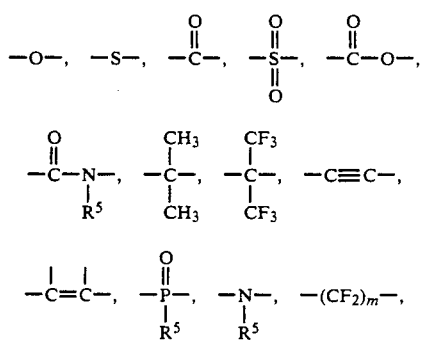

and

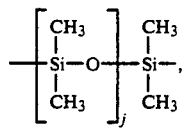

wherein each $R^5$ is independently selected from the group consisting of alkyl and aryl, m is an integer from 1-12, and j is an integer between 0 and 300.

DESCRIPTION OF A SPECIFIC EMBODIMENT

Polyamide-imides are widely used in composites and laminates and as high strength fibers and films.

The method for the preparation of polyamide-imides of the invention utilizes a palladium catalyzed carbonylation and condensation in solvent in which one of the groups involved is chloro.

The polyamide-imides of the invention have a repeating unit with the general formula

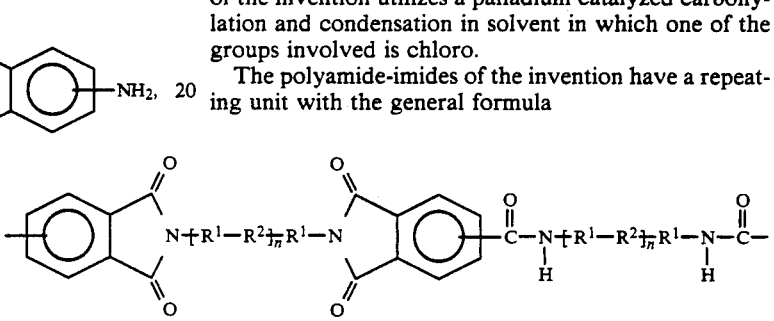

or

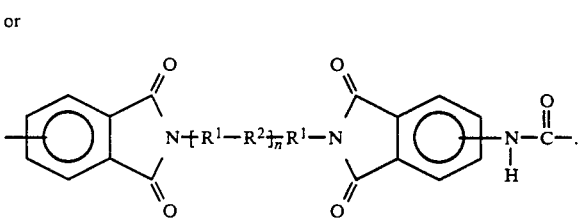

These polyamide-imides are produced by the reaction of carbon monoxide and, in respective order, a reactant pair having the general formulas

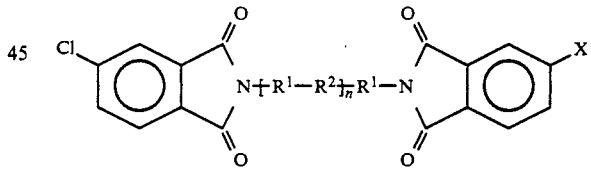

and $H_2N \!-\!\!\left(R^1\!-\!R^2\right)_{\!\!\overline{n}}\!R^1\!-\!NH_2$ or a chlorophthalimide-amine reactant having the general formula

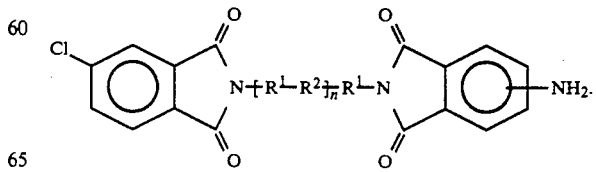

The bischlorophthalimide reactant and chlorophthalimide-aminephthalimide reactant above are also referred to herein by the terms "imide reactant" or "imide-amine reactant", respectively. The diamine reactant is also referred to by the term "comonomer".

Each X, $R^1$, $R^2$, and n is independently selected. X is —Br or —I. In the polymer formulas, carbonyls of the amide moieties are non-ortho.

$R^1$ can be substituted or unsubstituted and can be alkyl, arylalkyl, cycloalkyl, aryl, or heteroaryl. Example $R^1$ groups include: phenyl, biphenyl, naphthalene, anthracene, thiophene, benzothiophene, pyridine, quinoline, furan, dibenzofuran, aromatic sulfones, diaryletherss, diarylcarbonyls. These groups may be substituted by one or more alkyl groups, desirably alkyl groups having from 1 to 6 carbon atoms or more desirably methyl, ethyl, propyl and butyl groups. Additional substituents may include phenyl, halogen, hydroxy, amino, alkoxy having from 1 to 6 carbon atoms, and carboxylate groups. $R^1$ groups are unsubstituted or substituted with substituents which are unreactive, that is, substitutents which do not have a deleterious effect, for example steric hindrance or electronic deactivation, on the reaction of the dihalo compound in the polymerization reaction.

$R^2$ is a linking group, which in addition to connecting other portions of the molecule can also provide a selected functionality. Such functionality cannot react in the polymerization reaction, unless it is specifically desired that such reaction occur, in which case chain branching may occur. The selected functionality cannot seriously deactivate the diiodo imide compound toward reaction in the polymerization reaction, nor interfere with the reaction in any way. $R^2$ is selected from the group consisting of —O—, —S—,

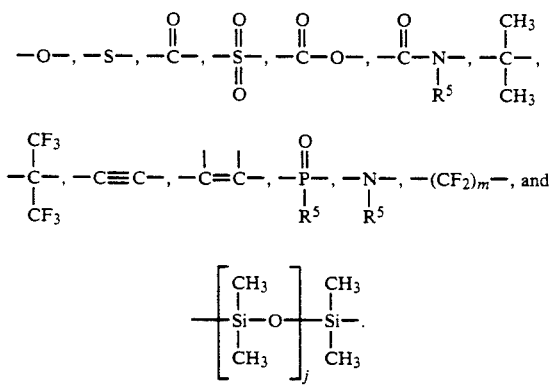

Each $R^5$ is independently selected from the group consisting of alkyl and aryl; m is an integer from 1-12; and j is an integer between 0 and 300.

In the formulas, n is an integer from 0 to 4.

Suitable dihalo imide reactants include: 1,4-bis(N-(4-chlorophthalimide))benzene, 1,3-bis(N-(4-chlorophthalimide))benzene, 4,4'-bis(N-(4-chlorophthalimide))-diphenylether, 3,4'-bis(N-(4-chlorophthalimide))diphenylether, and 1-{(N-(4-iodophthalimide)}-4-{N-(4-chlorophthalimide)}benzene.

Suitable diamino coreactants include: 1,4-diaminobenzene, 1,3-diaminobenzene, 4,4'-diaminodiphenylether, 3,4'-diaminodiphenylether, 4,4'-diaminodiphenylmethane, 4,4'-diaminobenzophenone, 4,4'-diaminodiphenylsulfone, 2,2-bis(4-(4-aminophenoxy)-phenyl)propane, 5-amino-3-(4-aminophenyl)-1,1,3-trimethylindane, 1,4-bis(2-(4-aminophenyl)-propyl)benzene, 4,4'-bis(3-aminophenoxy)diphenylsulfone, 1,6-diaminohexane, and bis(3-aminopropyl)-tetramethyldisiloxane.

Suitable halo-amino imide reactants include: 1-{(N-(4-aminophthalimide)}-4-{N-(4-chlorophthalimide)} benzene, 4-{N-(4-aminophthalimide)}-4'-{N-(3-chlorophthalimide)}diphenylether, 3-{N-(4-aminophthalimide)}-4'-{N-(4-chlorophthalimide)}diphenylether.

It is desirable that the imide reactant and any coreactant not have a valence as to a total of haloaryls and amines greater than two; however, imide reactants and coreactants, which bear more halogens or amines can be used if one wishes to introduce branching, which can affect the rheological, physical and processing properties of the polymer.

Polymer chain length could be limited by endcapping. One way of endcapping is by adding to the reaction mixture a portion of bischlorophthalimide reactant having the general formula

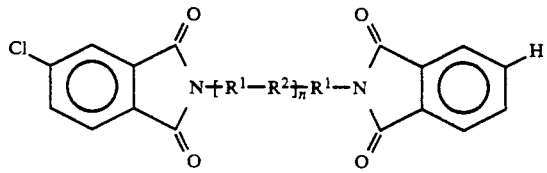

(referred to hereafter as "chlorophthalimide endcap reactant) or a portion of comonomer having the formula

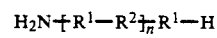

(referred to hereafter as "amine endcap #reactant) or both. If the bischloropthalimide reactant or the comonomer or both would be replaced in the method of the invention by corresponding chlorophthalimide and amine endcap reactants, then the small molecules: C—A—C, A—C—A or C—A, would be produced, in respective order. "C" represents a chlorophthalimide unit and "A" represents a comonomer unit.

Although reactants are discussed herein as individual compounds, the method of this application is not limited to reactions utilizing individual compounds as reactants, but is also inclusive of reactions utilizing mixtures of compounds as reactants. The method of the invention is not limited to any particular imide reactant, nor to any particular coreactant, however, it is necessary that a selected coreactant and/or imide reactant react under the reaction conditions employed. It is desirable that the reactants be sufficiently stable under the reaction conditions employed and that the reactants not be subject to an unacceptable amount of undesirable side reactions, to prevent the formation of an unacceptable amount of by-product. It is also desirable that the reactants be free of groups which unduly retard the reaction by, for example, steric hindrance or lowering the activity of the catalyst.

It is preferred in the method of the invention that bromine or iodine ions be present in the reaction mixture. The nature of the participation of those ions in the reaction has not been established. If the chlorophthalimide reactant has an iodoaryl or bromoaryl group, then the iodine or bromine ions generated from the reaction of the dihaloimide reactant is sufficient to increase the reaction rate, without the addition of additional salt. If the chlorophthalimide reactant has no iodoaryl or bromoaryl group, then bromine or iodine ions must be added by addition of iodine or bromine salt or the like.

The bromine or iodine salt or another salt may be optionally added in the reaction of the dihaloimide reactant. The addition of salt to the reaction mixture improves the solubility of some polymers, presumably by breaking up hydrogen bonding on the polymer chains. It is desirable to keep the polyamide-imide in solution from the standpoint of process efficiency. Suitable salts include $CaCl_2$ and salts of lithium such as LiCl and LiBr.

The reactants are contacted with carbon monoxide. It is convenient to add an excess of carbon monoxide to the reaction zone. The excess of carbon monoxide need not be measured; one can merely pressurize the vessel with carbon monoxide to the desired reaction pressure. Carbon monoxide can be at, or below atmospheric pressure or at a higher pressure. Carbon monoxide pressures up to 200 atmospheres or higher can be used in the process. It is expected that increasing the carbon monoxide pressure will yield a faster reaction rate and greater molecular weight polymers, if iodine ions are present, rather than just chlorine and bromine ions.

In the disclosed embodiments of the invention, the reaction step is conducted in the presence of an organic solvent, which appreciably dissolves both reactants to provide a liquid reaction medium and facilitates the contacting of the reactants and the catalyst. It is desirable that the solvent be "inert" to the reaction, i.e., that the solvent not enter into the reaction in an undesired way. The invention is not limited to a particular solvent or solvent system and a wide variety of organic compounds can be used. In a particular embodiment of the invention, exemplary solvents are hydrocarbon solvents, such as toluene and ether solvents, such as tetrahydrofuran, diglyme (2-methoxyethylether), and glyme (1,2-dimethoxyethane). In another embodiment of the invention, a desirable solvent is dipolar and aprotic, that is, the solvent is a highly polar molecule with hydrogens that are not easily abstractable. Exemplary dipolar aprotic solvents include dimethylformamide; dimethylacetamide; dimethylsulfoxide; 1,3-dimethyl-2-imidazolidinone; hexamethylphosphoramide; N-methylpyrrolidinone; N-cyclohexylpyrrolidinone; dimethylimidazolidinone; and the like.

The amount of solvent present is not critical to the reaction, however, it is desirable to use enough solvent to facilitate the reaction. Specific polymers can have optimum concentrations in various solvents. There is no theoretical upper limit on the amount of solvent employed, however, practical limits are imposed by the size of the reaction vessel, the ease of separation of product from the reaction medium, cost and other factors. It is ordinarily desirable that the amount of solvent used be within the range of from about 0.1 and about 1000 parts by weight based on the weight of imide reactant used. It is also ordinarily desirable that the reaction medium be agitated, for example, by stirring to facilitate the dissolution carbon monoxide.

The process of the invention is carried out in the presence of a catalyst. The catalyst is preferentially a palladium compound, where palladium is present in the zero valent or divalent state. However, other transition metal catalysts, e.g., platinum and nickel catalysts can be used. The palladium catalysts generally have one or more ligands bonded to one or more palladium atoms by ionic or covalent bonds. Simple palladium salts such as $PdX_2$, in which X is Cl, Br or I, can be used. Other representative palladium catalysts are listed below.

TABLE 1

| Palladium catalysts | |
|---|---|
| $Pd^{+2}$ | |
| $PdX_2L_2$ | X = Cl, Br, I |
| | L = $R_3P$, where R = alkyl or aryl |
| $Pd(OAc)_2$ | OAc = acetate |
| $Pd(OAc)_2L_2$ | OAc = acetate |
| $PdCl_2(RCN)_2$ | R = $CH_3$, Phenyl |
| $PhPdXL_2$ | X = Br, I |
| $PdCl_2(COD)_2$ | COD = cis, cis-1,5-cyclooctadiene |
| $Pd(acac)_2$ | acac = 2,4-pentanedionate |
| $PdCl_2DPPF$ | DPPF = 1,1'-bis(diphenylphosphino) ferrocene |
| $PdCl_2DPPF$ | DPPF = 1,2-bis(diphenylphosphino) ethane |
| $PdCl_2DPPF$ | DPPF = 1,3-bis(diphenylphosphino) propane |
| $PdCl_2DPPF$ | DPPF = 1,4-bis(diphenylphosphino) butane |
| $Pd^{(0)}$ | |
| $PdL_4$ | L = $R_3P$, where R = alkyl or aryl |
| 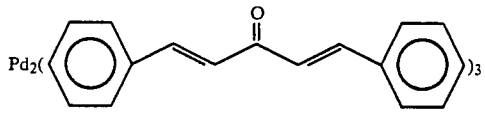 | |
| $Pd(DPPE)_2$ | DPPE = 1,2-bis(diphenylphosphino) ethane |
| $Pd(DPPP)_2$ | DPPP = 1,3-bis(diphenylphosphino) propane |
| $Pd(DPPB)_2$ | DPPB = 1,4-bis(diphenylphosphino) butane |

A catalytic amount of catalyst is employed. By "catalytic amount" is meant an amount of catalyst which catalyzes the reaction to the desired extent. Generally, the amount of catalyst is at least about 0.01 mole percent based on the amount of imide reactant. There is no real upper or lower limit on the amount of catalyst, this being defined by secondary considerations such as cost and ease of separation of the catalyst from products and unreacted reactants. A preferred catalytic amount is from about 0.005 to about 0.20 moles per mole of imide reactant. The catalyst may be bound to a support or unsupported.

The reaction can take place in the presence of an activating ligand, such as phosphine or arsine ligand. Such a ligand can be used with a catalyst, for example, triphenylphosphine with bis(triphenylphosphine) palladium(II) chloride, to increase the rate of the catalyzed reaction. The amount of ligand used is desirably between about 0.01 mole and about 5.0 moles per mole of metal catalst, and more desirably at about 2 moles per mole of metal catalyst. It is believed that the presence of the activating ligand speeds up the oxidative addition of such catalysts by making the catalyst more nucleophilic.

The process of this invention is preferably conducted in the presence of a base to neutralize by-product hydrogen halide. The base can be a tertiary amine such as tributylamine, pyridine, 1,8-diazobicyclo(5,4,0)-7-undecene (DBU) or 1,5-diazobicyclo(4,3,0)non-5-ene (DBN) or have the formula:

$NR_3$ wherein each R is independently selected from lower alkyl groups having from about 2 to about 6 carbon atoms. The base can be immobilized on a cross-linked polymer such as cross-liked poly(vinylpyridine) beads. Alternatively, the base can be another type of basic substance which does not react with the reactants, e.g., a metal carbonate such as $K_2CO_3$ or a metal hydroxide such as $Ca(OH)_2$ or a metal acetate such as sodium acetate. Generally, one employs at least enough base to react with the by-product hydrogen halide produced. An excess can be used, if desired, however, excess base may slow the rate of reaction by sequestering iodine or bromine ions.

As with the reactants, solvents and catalysts, a skilled practitioner will recognize that the exact structure of the base is not critical, and the examples of compounds set forth above are merely illustrative and not-limiting examples of materials that can be used in this invention. A skilled practitioner will recognize that other materials can be substituted in this invention to achieve similar results.

The process of this invention is preferably conducted at a temperature within the range of from about room temperature, i.e., about 20 degrees C., to about 250 degrees C. A desirable temperature range is from about 70 degrees C. to about 150 degrees C. A skilled practitioner will recognize that the reaction temperature is not critical, and that temperatures outside this range can be employed, if desired. Generally, one selects a reaction temperature which affords a reasonable rate of reaction and which does not give an undue amount of decomposition of products or reactants.

The reaction time is not a truly independent variable but is dependent at least to some extent on the other reaction parameters selected such as the reactivity of the reactants, activity and amount of catalyst, reaction temperature, pressure and so forth. Generally, reaction times within the range of from about 0.1 to about 100 hours are used.

The polyamide-imides of the method of the invention are useful as homopolymers, block copolymers or random copolymers or in blends with other materials or polymers. It is within the scope of the methods of the invention to produce polyamide-imides having number average molecular weights in a useful range for such purposes, for example, between about 1000 and about 150,000. The polymers of the invention may be used for engineering plastics or fibers or other high performance applications and depending upon the intended use, may include one or more additives, such as, inorganic fillers, reinforcing fibers, titanium dioxide, stabilizers, plasticizers, and antioxidants.

The following examples are presented for a further understanding of the invention:

PREPARATION OF BISPHTHALIMIDES

Bisphthalimides useful in the method of the invention can be produced using procedures exemplified by the following preparation.

Preparation of 3.4'-bis(N-(4-chloroohthalimide))diphenylether

A 200 milliliter round-bottom flask with a magnetic stirrer was charged with 3,4'-diaminodiphenylether (10 grams, 50 mmoles) and N,N-dimethyl acetamide (DMAc) (75 grams). 4-chlorophthalicanhydride (20 grams, 110 mmoles) was added. The reaction solution was heated with stirring on an oil bath to a temperature of about 70° C. Pyridine (60 grams) was added, the reaction mixture was stirred for 15 minutes and then acetic anhydride (90 grams) was added dropwise over 20 minutes. The reaction was stirred at 70° C. for 20 hours and poured into methanol. The bright yellow product was collected by filtration and triterated sucessively in water, methanol and acetone. The product was dried under vacuum at 80° C. overnight. The yield was 25.8 grams, 97% of theory. The melting point as determined by DSC conducted as in Example 1 was 243° C.

EXAMPLE 1

A clean, dry pressure vessel was charged with the following reagents under helium in a dry. box: 3,4'-bis(N-(4-chlorophthalimide))diphenylether (2.65 grams, 5.0 mmol), 2,2-bis(4-(4-aminophenoxy)phenyl)-propane (2.06 grams, 5.0 mmol), DMAc (30 grams), 1,8-diazabicyclo(5.4.0)undec-7-ene (DBU) (1.83 grams, 12 mmol), bis(triphenylphosphine)palladium(II) chloride ($PdCl_2L_2$) (0.1 grams, 0.125 mmol), triphenylphosphine (0.156 grams, 0.6 mmol). The vessel was sealed and removed from the dry box. The vessel was purged four times with high purity carbon monoxide, pressurized to 7 7 kg/cm$^2$ with carbon monoxide, and maintained, with magnetic stirring, in an oil bath at 100° C. for 48 hours. The viscous polymer solution was diluted with DMAc (30 milliliters), filtered, and precipitated into methanol. The recipitate was collected by vacuum filtration and dried under high vacuum at 110° C. for 48 hours. Yield was approximately quantitative. Size exclusion chromatography (SEC) data was obtained from a Waters HPLC using $\mu$-styragel columns of $10^6, 10^5, 10^4, 10^3$ Angstroms calibrated against poly(methylmethacrylate) standards in DMF/LiBr to obtain a weight average molecular weight determination (also referred to herein as M$_W$) of 15,900.

EXAMPLE 2

The same procedure was followed as in Example 1, except sodium iodide (0.5 grams) was added to the initial reaction mixture and the reaction was halted at 24 hours. The yield was approximately quantitive. The $M_w$ was 36,400.

While specific embodiments of the invention have been shown and described herein for purposes of illustration, the protection afforded by any patent which may issue upon this application is not strictly limited to a disclosed embodiment; but rather extends to all modifications and arrangements which fall fairly within the scope of the claims which are appended hereto:

What is claimed is:

1. A method for preparing polyamide-imide in the presence of solvent and a catalyst selected from group consisting of platinum, nickel and palladium catalysts, comprising reacting carbon monoxide and a reactant pair having respective general

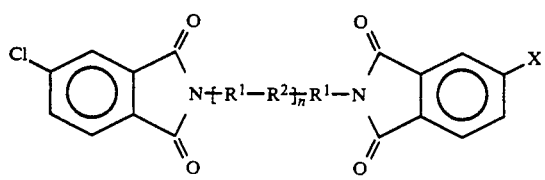

and

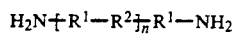

or wherein for the formulas herein each $R^1$, $R^2$ and n is independently selected, n is —Cl, —Br or —I, $R^1$ is selected from the group consisting of alkylene, arylalkylene, arylene, heteroarylene, cycloalkylene, $R^2$ is selected from the group consisting of

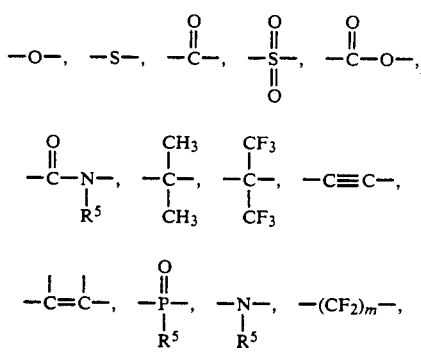

and

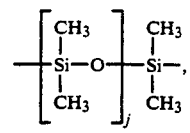

wherein each $R^5$ is independently selected from the group consisting of alkyl and aryl, m is an integer from 1-12, and j is an integer between 0 and 300.

2. The method of claim 1 wherein X is —Cl and said reacting is conducted in the presence of iodine or bromine ions.

3. The method of claim 1 wherein said reacting is in the presence of iodine ions and at a carbon monoxide pressure greater than atmospheric pressure.

4. The method of claim 1 further comprising neutralizing by-product hydrogen halide.

5. The method of claim 1 wherein $R^1$ is phenylene.

6. The method of claim 1 wherein n is zero.

7. The method of claim 1 wherein one member of said reactant pair is selected from the group consisting of 1,4- bis(N-(4-chlorophthalimide))benzene, 1,3-bis(N-(4-chlorophthalimide))benzene, 4,4'-bis(N-(4-chlorophthal-imide))diphenylether, 3,4'-bis(N-(4-chlorophthal-imide))diphenylether, and 1-{N-(4-iodophthalimide)}-4-{N-(4-chlorophthalimide)}benzene.

8. The method of claim 1 wherein one member of said reactant pair is selected from the group consisting of 1,4-diaminobenzene, 1,3-diaminobenzene, 4,4'-diaminodiphenylether, 3,4'-diaminodiphenylether, 4,4'-diaminodiphenylmethane, 4,4'-diaminobenzophenone, 4,4'-diaminodiphenylsulfone, 2,2-bis(4-(4-aminophenoxy)-phenyl)propane, 5-amino-3-(4-aminophenyl)-1,1,3-trimethylindane, 1,4-bis (2-(4-aminophenyl)propyl)-benzene, 4,4'-bis (3-aminophenoxy)diphenylsulfone, 1,6-diaminohexane, and bis(3-aminopropyl)tetramethyl-di-siloxane.

9. The method of claim 1 wherein one member of said reactant pair is selected from the group consisting of 1,4-bis(N-(4-chlorophthalimide))benzene, 1,3-bis(N-(4-chloro-phthalimide))benzene, 4,4'-bis(N-(4-chlorophthal-imide))diphenylether, 3,4'-bis(N-(4-chlorophthal-imide))diphenylether, 1-{N-(4-iodophthalimide)}-4{N-(4-chlorophthalimide(}benzene, and the other member of said reactant pair is selected from the group consisting of 1,4-diaminobenzene, 1,3-diaminobenzene, 4,4'-diaminodiphenylether, 3,4'-diaminodiphenylether, 4,4'-diaminodiphenylmethane, 4,4'-diaminobenzophenone, 4,4'-diaminodiphenylsulfone, 2,2-bis(4-(4-aminophenoxy)phenyl)propane, 5-amino-3-(4-aminophenyl)-1,1,3-trimethylindane, 1,4-bis(2-(4-aminophenyl)propyl)benzene, 4,4'-bis(3-aminophenoxy)-di-phenylsulfone, 1,6-diaminohexane, bis (3-aminopropyl)-tetramethyldisiloxane.

* * * * *